US011939033B2

(12) United States Patent
Inoue

(10) Patent No.: US 11,939,033 B2
(45) Date of Patent: Mar. 26, 2024

(54) FUEL MANAGEMENT SYSTEM CAPABLE OF FREELY PERFORMING TRANSFER OF FUEL AMONG A PLURALITY OF FUEL TANKS

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/835,270

(22) Filed: Jun. 8, 2022

(65) Prior Publication Data

US 2023/0020034 A1 Jan. 19, 2023

(30) Foreign Application Priority Data

Jul. 16, 2021 (JP) ................................ 2021-118124

(51) Int. Cl.

*B63B 39/03* (2006.01)
*B63B 79/40* (2020.01)
*B63H 21/38* (2006.01)
*F02M 37/00* (2006.01)
*F02M 37/04* (2006.01)

(52) U.S. Cl.

CPC ............. *B63B 39/03* (2013.01); *B63B 79/40* (2020.01); *B63H 21/38* (2013.01); *F02M 37/0017* (2013.01); *F02M 37/0088* (2013.01); *F02M 37/04* (2013.01)

(58) Field of Classification Search

CPC .... B63H 17/0027; B63H 21/38; B63H 39/03; F02M 37/0017; F02M 37/0047; F02M 37/007; F02M 37/0076; F02M 37/0088; F02M 37/0094; F02M 37/04; F02D 19/0665; B60K 2015/03118; B60K 2015/03138; B60K 2015/03144

See application file for complete search history.

(56) References Cited

U.S. PATENT DOCUMENTS 3,101,771 A * 8/1963 McCuen ............... F02M 37/10 137/263
3,158,193 A * 11/1964 Anderson ........... F02M 37/007 137/411
3,981,321 A * 9/1976 Risse ................ F02M 37/0052 244/135 C
4,591,115 A * 5/1986 DeCarlo ............... B64C 17/10 137/263

(Continued)

FOREIGN PATENT DOCUMENTS

CN 112832938 A * 5/2021 ............. B60K 15/03
JP 62-78065 A 4/1987

(Continued)

*Primary Examiner* — John M Zaleskas
(74) *Attorney, Agent, or Firm* — Keating & Bennett, LLP

(57) ABSTRACT

A fuel management system including a fuel pump and a flow meter to transfer and control remaining amounts fuel among fuel tanks mounted on a hull of a marine vessel includes first fuel flow channels corresponding to the fuel tanks to connect the fuel tanks to an upstream side of the fuel pump and the flow meter, and second fuel flow channels corresponding to the fuel tanks to connect the fuel tanks to a downstream side of the fuel pump and the flow meter.

12 Claims, 7 Drawing Sheets

(56) References Cited

U.S. PATENT DOCUMENTS

| | | | | | |
|---|---|---|---|---|---|
| 4,653,552 | A | 3/1987 | Friedle | | |
| 5,163,466 | A * | 11/1992 | Moody | F02M 37/0052 | 137/255 |
| 5,168,891 | A * | 12/1992 | Green | F02M 37/0023 | 137/448 |
| 5,186,352 | A * | 2/1993 | Otto | F02M 37/007 | 220/501 |
| 5,305,908 | A * | 4/1994 | Otto | F02M 37/007 | 220/746 |
| 5,960,809 | A * | 10/1999 | Keller | F02M 37/0088 | 137/12 |
| 6,371,151 | B1 * | 4/2002 | Saylor | F02M 37/007 | 137/565.29 |
| 6,382,225 | B1 * | 5/2002 | Tipton | B60K 15/00 | 123/514 |
| 9,932,096 | B1 * | 4/2018 | George | F02M 37/0052 | |
| 2001/0035215 | A1 * | 11/2001 | Tipton | G01F 23/36 | 137/571 |
| 2003/0056824 | A1 * | 3/2003 | Harvey | F02M 37/0088 | 137/265 |
| 2004/0020474 | A1 * | 2/2004 | Pratt | F02M 37/007 | 123/514 |
| 2004/0069344 | A1 * | 4/2004 | Osterkil | B60K 15/077 | 137/255 |
| 2005/0224057 | A1 * | 10/2005 | Tokumaru | F02M 21/0212 | 123/527 |
| 2006/0037587 | A1 * | 2/2006 | Mc Clure | F02M 55/00 | 123/514 |
| 2006/0081223 | A1 * | 4/2006 | Kangler | F02M 31/10 | 123/549 |
| 2006/0086342 | A1 * | 4/2006 | Studebaker | F02M 37/0023 | 123/514 |
| 2006/0086389 | A1 * | 4/2006 | Erickson | F02D 33/003 | 137/255 |
| 2007/0089659 | A1 * | 4/2007 | Bruckner | B63B 39/03 | 114/124 |
| 2009/0314262 | A1 * | 12/2009 | Sellentin | F02D 19/066 | 123/557 |
| 2010/0024771 | A1 * | 2/2010 | Bidner | F02D 19/081 | 123/577 |
| 2010/0024789 | A1 * | 2/2010 | Lippa | F02D 19/0665 | 123/577 |
| 2011/0073057 | A1 * | 3/2011 | Lippa | F02M 37/0088 | 123/703 |
| 2011/0174562 | A1 * | 7/2011 | Uchimura | H01M 8/04089 | 220/86.1 |
| 2011/0209689 | A1 * | 9/2011 | Kuhn | F02M 37/0088 | 123/495 |
| 2011/0220063 | A1 * | 9/2011 | Lippa | F02D 19/0665 | 123/431 |
| 2012/0139225 | A1 * | 6/2012 | Sonderegger | B60K 15/03 | 123/514 |
| 2015/0041415 | A1 * | 2/2015 | Cope | F02M 37/32 | 210/90 |
| 2015/0184617 | A1 * | 7/2015 | Kim | F02D 19/0665 | 123/495 |
| 2015/0192093 | A1 * | 7/2015 | Lee | F02M 21/0221 | 123/495 |
| 2016/0069309 | A1 * | 3/2016 | Takaoka | F02M 37/0047 | 123/468 |
| 2016/0245244 | A1 * | 8/2016 | Katsura | F02M 21/0212 | |
| 2017/0166044 | A1 * | 6/2017 | Asahara | F02M 37/0017 | |
| 2018/0202395 | A1 * | 7/2018 | Hoover | F02M 21/0239 | |
| 2019/0285010 | A1 * | 9/2019 | Sonnek | F02D 41/0025 | |
| 2020/0171937 | A1 * | 6/2020 | Lassesson | F02M 37/0023 | |
| 2020/0290455 | A1 * | 9/2020 | Oliveira Capucho | B60K 15/03 | |
| 2023/0020594 | A1 * | 1/2023 | Inoue | G01F 23/804 | |

FOREIGN PATENT DOCUMENTS

| | | | | | |
|---|---|---|---|---|---|
| JP | 09-105365 | A | | 4/1997 | |
| JP | 2002195121 | A | * | 7/2002 | F02D 33/003 |
| KR | 20070059552 | A | * | 6/2007 | |
| KR | 20110105905 | A | * | 9/2011 | |
| KR | 20190072949 | A | * | 6/2019 | F02D 33/003 |
| WO | WO-2013093544 | A1 | * | 6/2013 | B60K 15/03 |

* cited by examiner

FUEL MANAGEMENT SYSTEM CAPABLE OF FREELY PERFORMING TRANSFER OF FUEL AMONG A PLURALITY OF FUEL TANKS

CROSS REFERENCE TO RELATED APPLICATIONS

This application claims the benefit of priority to Japanese Patent Application No. 2021-118124, filed on Jul. 16, 2021. The entire contents of this application are hereby incorporated herein by reference.

BACKGROUND OF THE INVENTION

1. Field of the Invention

The present invention relates to a fuel management system.

2. Description of the Related Art

In a marine vessel with a plurality of fuel tanks, each fuel tank is connected to an engine by pipes or hoses, and each fuel tank supplies fuel to the engine individually (see, for example, Japanese Laid-Open Patent Publication (kokai) No. H9-105365). Further, it is also known that each fuel tank is connected to each other by pipes or hoses and fuel is transferred from one fuel tank to the other fuel tank (see, for example, Japanese Laid-Open Patent Publication (kokai) No. S62-78065).

However, for example, in the technique of Japanese Laid-Open Patent Publication (kokai) No. S62-78065, although it is possible to transfer fuel from one fuel tank to the other fuel tank, it is not possible to transfer fuel from the other fuel tank to one fuel tank, and it is possible to perform only one-way transfer of fuel. Therefore, there is room for improvement in the conventional technique in terms of transfer of fuel among a plurality of fuel tanks.

SUMMARY OF THE INVENTION

Preferred embodiments of the present invention provide fuel management systems that are each able to freely perform transfer of fuel among a plurality of fuel tanks.

According to a preferred embodiment of the present invention, a fuel management system including a fuel pump and a flow meter to control remaining amounts of fuel in a plurality of fuel tanks mounted on a hull of a marine vessel includes a plurality of first fuel flow channels corresponding to the plurality of fuel tanks to connect the plurality of fuel tanks to an upstream side of the fuel pump and the flow meter, and a plurality of second fuel flow channels corresponding to the plurality of fuel tanks to connect the plurality of fuel tanks to a downstream side of the fuel pump and the flow meter.

According to another preferred embodiment of the present invention, a fuel management system including a fuel pump to control remaining amounts of fuel in a plurality of fuel tanks mounted on a hull of a marine vessel includes a management tank connected to an engine, a plurality of first fuel flow channels corresponding to the plurality of fuel tanks to connect the plurality of fuel tanks to an upstream side of the fuel pump, a plurality of second fuel flow channels corresponding to the plurality of fuel tanks to connect the plurality of fuel tanks to a downstream side of the fuel pump, a third fuel flow channel to connect the management tank to the upstream side of the fuel pump, a fourth fuel flow channel to connect the management tank to the downstream side of the fuel pump, and a controller configured or programmed to transfer fuel from the management tank to one fuel tank of the plurality of fuel tanks by the fuel pump, wherein each of the plurality of fuel tanks includes a fuel sender, the management tank includes another calibrated fuel sender, and when transferring fuel from the management tank to the one fuel tank by the fuel pump, the controller is configured or programmed to perform a calibration of the fuel sender of the one fuel tank by using a change in an output value of the fuel sender of the one fuel tank and a change in an output value of the another calibrated fuel sender.

According to a preferred embodiment of the present invention, since each of the plurality of fuel tanks is connected to the upstream side of the fuel pump by the first fuel flow channels and to the downstream side of the fuel pump by the second fuel flow channels, it is possible to arbitrarily set the fuel tank out of which the fuel pump sucks the fuel, and the fuel tank to which the fuel is supplied from the fuel pump. As a result, not only is it possible to perform the transfer of fuel from one fuel tank to another fuel tank, but also it is possible to perform the transfer of fuel from the another fuel tank to the one fuel tank. That is, it is possible to freely perform the transfer of fuel among the plurality of fuel tanks.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
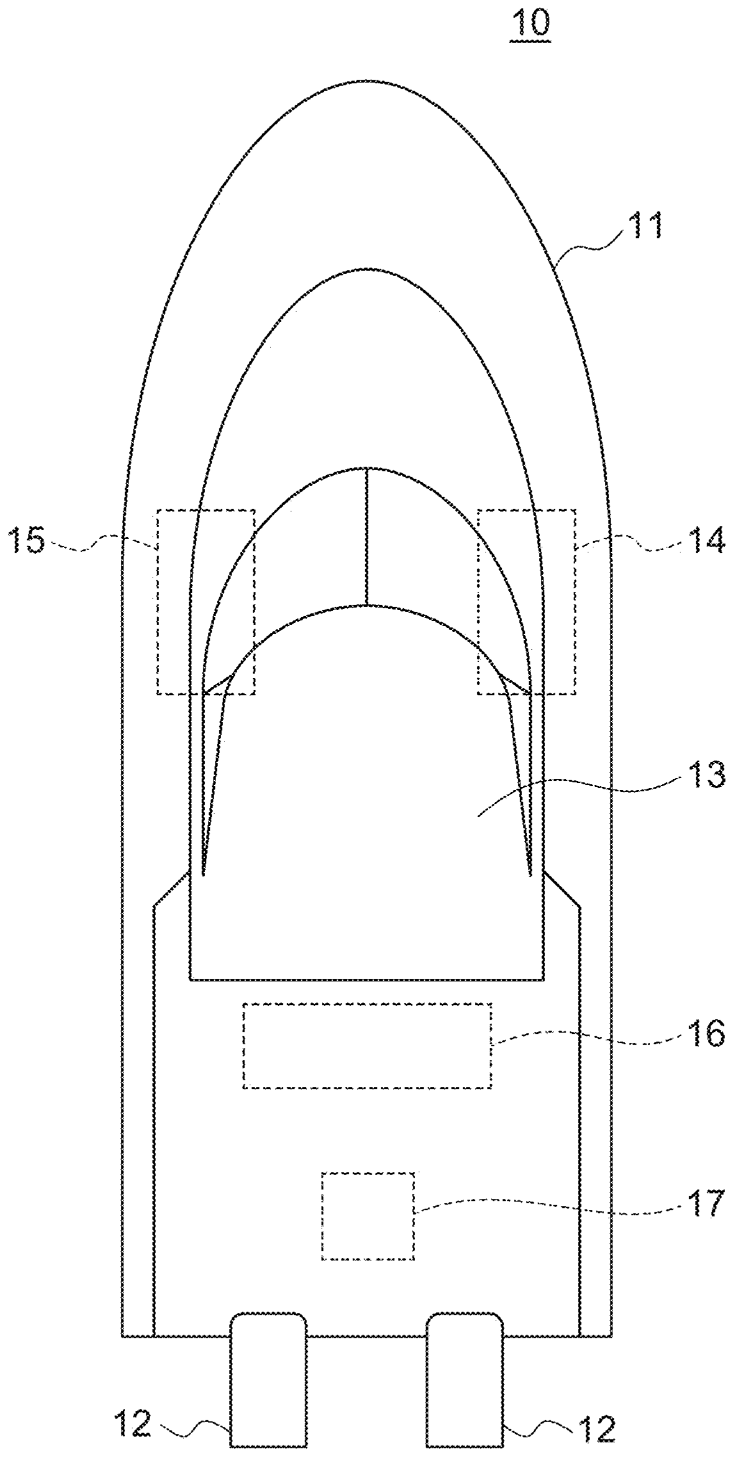
FIG. 1 is a plan view that shows a marine vessel to which a fuel management system according to a preferred embodiment of the present invention is applied.

FIG. 1 is a plan view that shows a marine vessel to which a fuel management system according to a preferred embodiment of the present invention is applied.

As shown in FIG. 1, a marine vessel 10 includes a hull 11 and two outboard motors 12 attached to the stern of the hull 11, and a cabin 13 is provided near the center of the hull 11. Further, the marine vessel 10 includes three fuel tanks (i.e., a fuel tank 14, a fuel tank 15, and a fuel tank 16) and one management tank 17 inside the hull 11.

As shown in FIG. 1, the fuel tanks 14 and 15 are located on both sides of the cabin 13, and on the other hand, the fuel tank 16 is located on the stern side. Further, the management tank 17 is located closer to the stern side than the fuel tank 16. It should be noted that a plurality of fuel tanks only needs to be provided, and the marine vessel 10 may include two fuel tanks or four or more fuel tanks. It should be noted that locations of the fuel tanks 14 to 16 and the management tank 17 are not limited to locations shown in FIG. 1.

Figure 2:
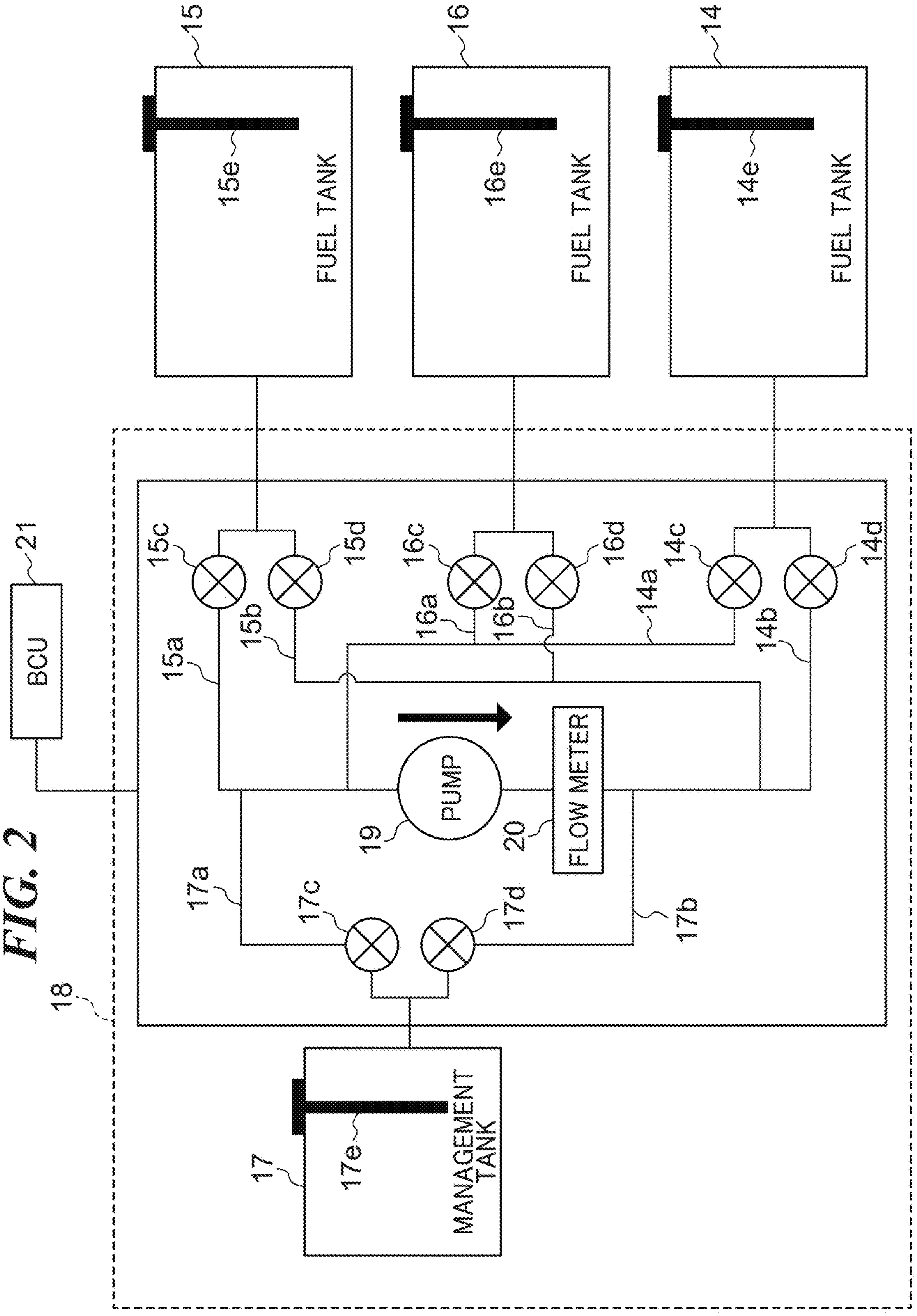
FIG. 2 is a block diagram for explaining a configuration of the fuel management system according to a preferred embodiment of the present invention.

FIG. 2 is a block diagram for explaining a configuration of the fuel management system according to a preferred embodiment of the present invention. As shown in FIG. 2, a fuel management system 18 includes the management tank 17, a fuel pump 19, a flow meter 20, upstream side flow channels 14*a*, 15*a*, and 16*a* (first fuel flow channels), an upstream side flow channel 17*a* (a third fuel flow channel), downstream side flow channels 14*b*, 15*b*, and 16*b* (second fuel flow channels), a downstream side flow channel 17*b* (a fourth fuel flow channel), upstream side valves 14*c*, 15*c*, and 16*c* (first valves), an upstream side valve 17*c* (a third valve), downstream side valves 14*d*, 15*d*, and 16*d* (second valves), a downstream side valve 17*d* (a fourth valve), and a BCU (Boat Control Unit) 21 that functions as a controller.

The management tank 17 functions as an auxiliary tank and is connected to an engine of each of the outboard motors 12 by a fuel route (not shown). Further, the management tank 17 includes a fuel sender 17*e* that measures a remaining amount of fuel in the management tank 17.

The fuel pump 19 pressure-feeds the fuel flowing from the upstream side to the downstream side. It should be noted that a pressure-feeding direction of the fuel is indicated by an arrow in FIG. 2. Further, as shown in FIG. 2, the flow meter 20 is located downstream of the fuel pump 19 so as to be adjacent to the fuel pump 19, and measures a flow rate of the fuel pressure-fed by the fuel pump 19. It should be noted that the flow meter 20 may be located upstream of the fuel pump 19.

The upstream side flow channel 14*a* connects the fuel tank 14 to the upstream side of the fuel pump 19, and the downstream side flow channel 14*b* connects the fuel tank 14 to the downstream side of the fuel pump 19 via the flow meter 20. The upstream side valve 14*c* is located in the upstream side flow channel 14*a*, and the upstream side valve 14*c* opens and closes the upstream side flow channel 14*a*. The downstream side valve 14*d* is located in the downstream side flow channel 14*b*, and the downstream side valve 14*d* opens and closes the downstream side flow channel 14*b*. The upstream side flow channel 14*a* and the downstream side flow channel 14*b* merge at a location between the fuel tank 14 and the upstream side valve 14*c* and the downstream side valve 14*d*, and are connected to the fuel tank 14. The fuel tank 14 includes a fuel sender 14*e* that measures a remaining amount of the fuel in the fuel tank 14.

The upstream side flow channel 15*a* connects the fuel tank 15 to the upstream side of the fuel pump 19, and the downstream side flow channel 15*b* connects the fuel tank 15 to the downstream side of the fuel pump 19 via the flow meter 20. The upstream side valve 15*c* is located in the upstream side flow channel 15*a*, and the upstream side valve 15*c* opens and closes the upstream side flow channel 15*a*. The downstream side valve 15*d* is located in the downstream side flow channel 15*b*, and the downstream side valve 15*d* opens and closes the downstream side flow channel 15*b*. The upstream side flow channel 15*a* and the downstream side flow channel 15*b* merge at a location between the fuel tank 15 and the upstream side valve 15*c* and the downstream side valve 15*d*, and are connected to the fuel tank 15. The fuel tank 15 includes a fuel sender 15*e* that measures a remaining amount of the fuel in the fuel tank 15.

The upstream side flow channel 16*a* connects the fuel tank 16 to the upstream side of the fuel pump 19, and the downstream side flow channel 16*b* connects the fuel tank 16 to the downstream side of the fuel pump 19 via the flow meter 20. The upstream side valve 16*c* is located in the upstream side flow channel 16*a*, and the upstream side valve 16*c* opens and closes the upstream side flow channel 16*a*. The downstream side valve 16*d* is located in the downstream side flow channel 16*b*, and the downstream side valve 16*d* opens and closes the downstream side flow channel 16*b*. The upstream side flow channel 16*a* and the downstream side flow channel 16*b* merge at a location between the fuel tank 16 and the upstream side valve 16*c* and the downstream side valve 16*d*, and are connected to the fuel tank 16. The fuel tank 16 includes a fuel sender 16*e* that measures a remaining amount of the fuel in the fuel tank 16.

The upstream side flow channel 17*a* connects the management tank 17 to the upstream side of the fuel pump 19, and the downstream side flow channel 17*b* connects the management tank 17 to the downstream side of the fuel pump 19 via the flow meter 20. The upstream side valve 17*c* is located in the upstream side flow channel 17*a*, and the upstream side valve 17*c* opens and closes the upstream side flow channel 17*a*. The downstream side valve 17*d* is located in the downstream side flow channel 17*b*, and the downstream side valve 17*d* opens and closes the downstream side flow channel 17*b*. The upstream side flow channel 17*a* and the downstream side flow channel 17*b* merge at a location between the management tank 17 and the upstream side valve 17*c* and the downstream side valve 17*d*, and are connected to the management tank 17. The management tank 17 includes the fuel sender 17*e* that measures the remaining amount of the fuel in the management tank 17.

The upstream side flow channels 14*a*, 15*a*, 16*a*, and 17*a* merge at a location between the fuel pump 19 and the upstream side valves 14*c*, 15*c*, 16*c*, and 17*c*, and are connected to the fuel pump 19. The downstream side flow channels 14*b*, 15*b*, 16*b*, and 17*b* merge at a location directly under the flow meter 20, but branch off until they reach the downstream side valves 14*d*, 15*d*, 16*d*, and 17*d*.

The BCU 21 controls a pressure-feeding operation of the fuel pump 19, opening/closing operations of the upstream side valves 14*c*, 15*c*, 16*c*, and 17*c*, and opening/closing operations of the downstream side valves 14*d*, 15*d*, 16*d*, and 17*d*. In particular, in the fuel management system 18, the BCU 21 controls the transfer of fuel among the management tank 17 and the fuel tanks 14, 15, and 16 by controlling the opening/closing operations of the downstream side valves 14*d*, 15*d*, 16*d*, and 17*d*. Further, when the fuel is transferred among the management tank 17 and the fuel tanks 14, 15, and 16, the BCU 21 determines (obtains) an amount of the transferred fuel by the flow meter 20. It should be noted that the fuel management system 18 is mounted on the hull 11.

Figure 3:
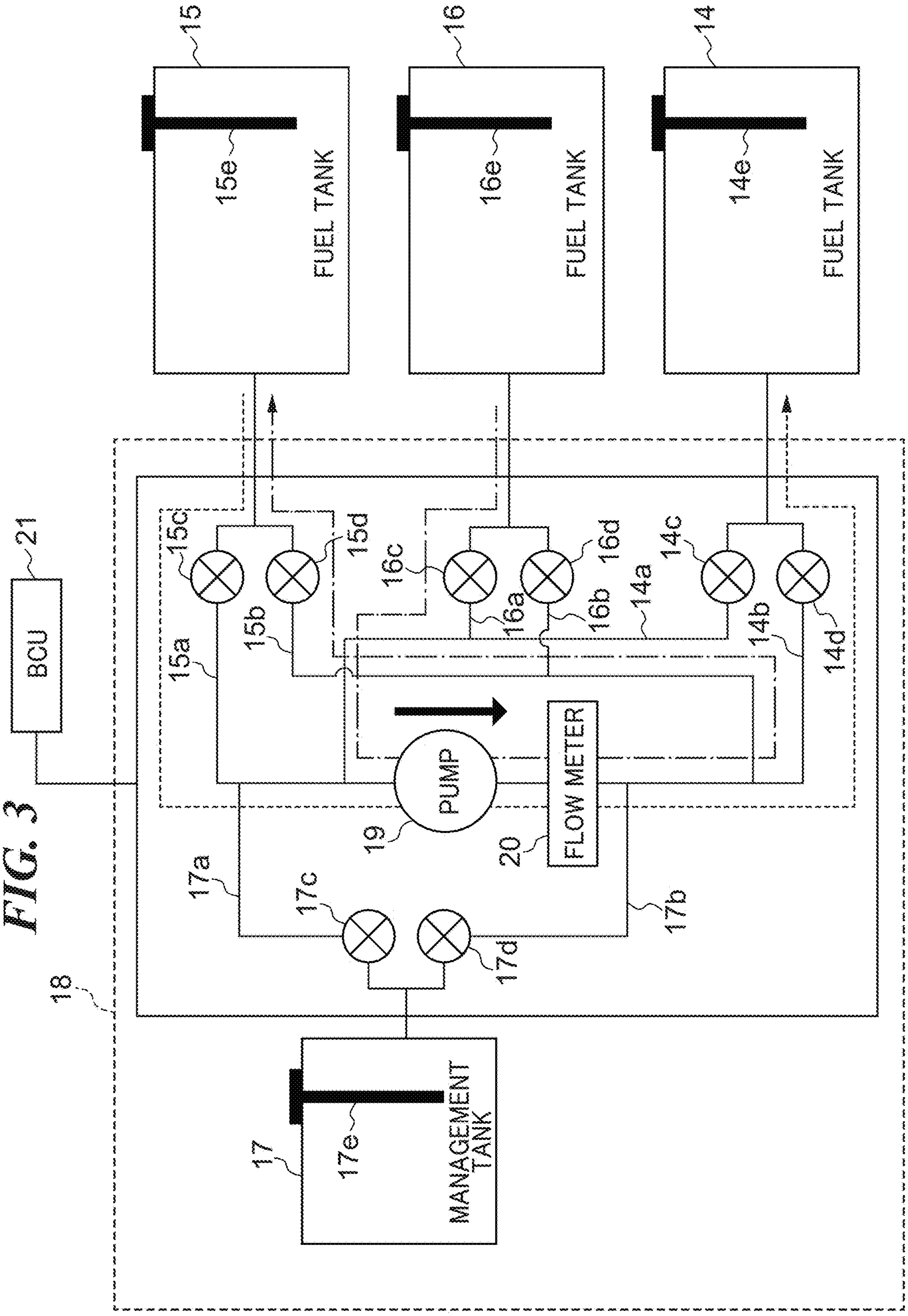
FIG. 3 is a diagram for explaining the transfer of fuel between two fuel tanks.

FIG. 3 is a diagram for explaining the transfer of fuel between the two fuel tanks. For example, in the case of transferring fuel from the fuel tank 15 to the fuel tank 14, the BCU 21 opens only the upstream side valve 15*c* and the downstream side valve 14*d*, and closes the other upstream side valves 14*c*, 16*c*, and 17*c*, and the other downstream side valves 15*d*, 16*d*, and 17*d*. As a result, the fuel tank 15 communicates with the fuel tank 14 via the upstream side flow channel 15*a*, the fuel pump 19, the flow meter 20, and the downstream side flow channel 14*b*. At this time, since the fuel pump 19 pressure-feeds the fuel from the upstream side flow channel 15*a* toward the downstream side flow channel 14*b*, the fuel sucked out from the fuel tank 15 is supplied toward the fuel tank 14. As a result, the fuel is transferred from the fuel tank 15 to the fuel tank 14. It should be noted that a fuel transfer route at this time is indicated by a broken line in FIG. 3.

In the case of transferring fuel from the fuel tank 16 to the fuel tank 15, the BCU 21 opens only the upstream side valve 16*c* and the downstream side valve 15*d*, and closes the other upstream side valves 14*c*, 15*c*, and 17*c*, and the other downstream side valves 14*d*, 16*d*, and 17*d*. As a result, the fuel tank 16 communicates with the fuel tank 15 via the upstream side flow channel 16*a*, the fuel pump 19, the flow meter 20, and the downstream side flow channel 15*b*. At this time, since the fuel pump 19 pressure-feeds the fuel from the upstream side flow channel 16*a* toward the downstream side flow channel 15*b*, the fuel sucked out from the fuel tank 16 is supplied toward the fuel tank 15. As a result, the fuel is transferred from the fuel tank 16 to the fuel tank 15. It should be noted that a fuel transfer route at this time is indicated by an alternate long and short dash line in FIG. 3.

In this way, in the fuel management system 18, the BCU 21 controls the opening/closing operations of the upstream side valves 14*c*, 15*c*, 16*c*, and 17*c*, and the opening/closing operations of the downstream side valves 14*d*, 15*d*, 16*d*, and 17*d* so as to control the transfer of fuel between two fuel tanks of the fuel tanks 14, 15, and 16.

When fuel is transferred between two fuel tanks, the BCU 21 is able to determine (obtain) the amount of the transferred fuel by the flow meter 20. Therefore, in a preferred embodiment of the present invention, when the fuel is transferred between two fuel tanks, calibrations of the fuel sender 14*e* included in the fuel tank 14, the fuel sender 15*e* included in the fuel tank 15, and the fuel sender 16*e* included in the fuel tank 16 are performed. For example, in the case of transferring fuel from the fuel tank 15 to the fuel tank 14, the BCU 21 is able to determine (obtain) an amount of the fuel transferred from the fuel tank 15 to the fuel tank 14 (hereinafter, referred to as "a first fuel transfer amount").

It should be noted that the first fuel transfer amount is not only equal to a decrease in the amount of fuel in the fuel tank 15, but also equal to an increase in the amount of fuel in the fuel tank 14. Therefore, the BCU 21 is able to perform the calibration of the fuel sender 15*e* by comparing the first fuel transfer amount with a change amount of an output value of the fuel sender 15*e* of the fuel tank 15. Further, the BCU 21 is able to perform the calibration of the fuel sender 14*e* by comparing the first fuel transfer amount with a change amount of an output value of the fuel sender 14*e* of the fuel tank 14.

In the case of transferring fuel from the fuel tank 16 to the fuel tank 15, the BCU 21 is able to determine (obtain) an amount of the fuel transferred from the fuel tank 16 to the fuel tank 15 (hereinafter, referred to as "a second fuel transfer amount").

It should be noted that the second fuel transfer amount is not only equal to a decrease in the amount of fuel in the fuel tank 16, but also equal to an increase in the amount of fuel in the fuel tank 15. Therefore, the BCU 21 is able to perform the calibration of the fuel sender 16*e* by comparing the second fuel transfer amount with a change amount of an output value of the fuel sender 16*e* of the fuel tank 16. Further, the BCU 21 is able to perform the calibration of the fuel sender 15*e* by comparing the second fuel transfer amount with the change amount of the output value of the fuel sender 15*e* of the fuel tank 15.

In this way, in the fuel management system 18, the BCU 21 is able to perform the calibration of the fuel sender of each fuel tank by comparing the fuel transfer amount between the two fuel tanks with the change amount of the output value of the fuel sender of each fuel tank.

Figure 4:
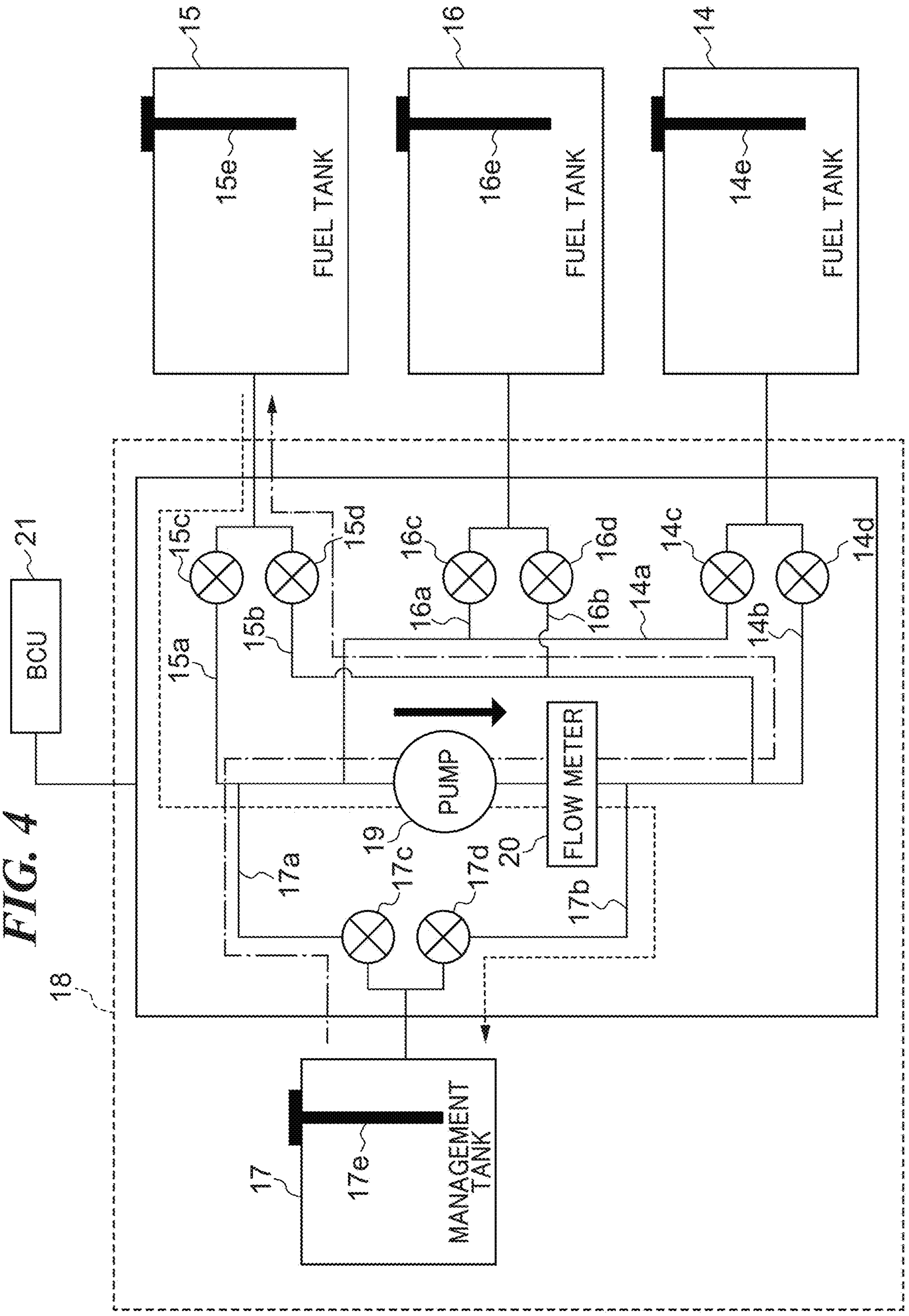
FIG. 4 is a diagram for explaining the transfer of fuel between a management tank and a fuel tank.

FIG. 4 is a diagram for explaining the transfer of fuel between the management tank and the fuel tank. For example, in the case of transferring fuel from the fuel tank 15 to the management tank 17, the BCU 21 opens only the upstream side valve 15*c* and the downstream side valve 17*d*, and closes the other upstream side valves 14*c*, 16*c*, and 17*c*, and the other downstream side valves 14*d*, 15*d*, and 16*d*. As a result, the fuel tank 15 communicates with the management tank 17 via the upstream side flow channel 15*a*, the fuel pump 19, the flow meter 20, and the downstream side flow channel 17*b*. At this time, since the fuel pump 19 pressure-feeds the fuel from the upstream side flow channel 15*a* toward the downstream side flow channel 17*b*, the fuel sucked out from the fuel tank 15 is supplied toward the management tank 17. As a result, the fuel is transferred from the fuel tank 15 to the management tank 17. It should be noted that a fuel transfer route at this time is indicated by a broken line in FIG. 4.

In the case of transferring fuel from the management tank 17 to the fuel tank 15, the BCU 21 opens only the upstream side valve 17*c* and the downstream side valve 15*d*, and closes the other upstream side valves 14*c*, 15*c*, and 16*c*, and the other downstream side valves 14*d*, 16*d*, and 17*d*. As a result, the management tank 17 communicates with the fuel tank 15 via the upstream side flow channel 17*a*, the fuel pump 19, the flow meter 20, and the downstream side flow channel 15*b*. At this time, since the fuel pump 19 pressure-feeds the fuel from the upstream side flow channel 17*a* toward the downstream side flow channel 15*b*, the fuel sucked out from the management tank 17 is supplied toward the fuel tank 15. As a result, the fuel is transferred from the management tank 17 to the fuel tank 15. It should be noted that a fuel transfer route at this time is indicated by an alternate long and short dash line in FIG. 4.

In this way, in the fuel management system 18, the BCU 21 controls the opening/closing operations of the upstream side valves 14*c*, 15*c*, 16*c*, and 17*c*, and the opening/closing operations of the downstream side valves 14*d*, 15*d*, 16*d*, and 17*d* so as to control the transfer of fuel between the management tank 17, and any one of the fuel tanks 14, 15, and 16.

When the fuel is transferred between the management tank and the fuel tank, the BCU 21 is able to determine (obtain) the amount of the transferred fuel by the flow meter 20. Therefore, in a preferred embodiment of the present invention, when the fuel is transferred between the management tank and a fuel tank, the calibrations of the fuel sender 14*e* included in the fuel tank 14, the fuel sender 15*e* included in the fuel tank 15, and the fuel sender 16*e* included in the fuel tank 16 are performed. For example, in the case of transferring fuel from the management tank 17 to the fuel tank 15, the BCU 21 is able to determine(obtain) an amount of the fuel transferred from the management tank 17 to the fuel tank 15 (hereinafter, referred to as "a third fuel transfer amount").

It should be noted that the third fuel transfer amount is equal to the increase in the amount of the fuel in the fuel tank 15. Therefore, the BCU 21 is able to perform the calibration of the fuel sender 15*e* by comparing the third fuel transfer amount with the change amount of the output value of the fuel sender 15*e* of the fuel tank 15.

In this way, in the fuel management system 18, the BCU 21 is able to perform the calibration of the fuel sender of each fuel tank by comparing the fuel transfer amount between the management tank and the fuel tank with the change amount of the output value of the fuel sender of the fuel tank to which the fuel is transferred.

According to a preferred embodiment of the present invention, since the upstream side flow channels 14*a*, 15*a*, 16*a*, and 17*a*, which connect the fuel tanks 14, 15, and 16 and the management tank 17 to the upstream side of the fuel pump 19, respectively, and the downstream side flow channels 14*b*, 15*b*, 16*b*, and 17*b*, which connect the fuel tanks 14, 15, and 16 and the management tank 17 to the downstream side of the fuel pump 19, respectively, are provided, the upstream side valves 14*c*, 15*c*, 16*c*, and 17*c* are located in the upstream side flow channels 14*a*, 15*a*, 16*a*, and 17*a*, respectively, and the downstream side valves 14*d*, 15*d*, 16*d*, and 17*d* are located in the downstream side flow channels 14*b*, 15*b*, 16*b*, and 17*b*, respectively, it is possible to arbitrarily set the fuel tank out of which the fuel pump 19 sucks the fuel, and the fuel tank to which the fuel is supplied from the fuel pump 19 by controlling the opening/closing operations of the upstream side valves 14*c*, 15*c*, 16*c*, and 17*c*, and the opening/closing operations of the downstream side valves 14*d*, 15*d*, 16*d*, and 17*d*. As a result, it is possible to freely perform the transfer of fuel among the management tank 17 and the fuel tanks 14, 15, and 16.

Since the fuel tanks 14, 15, and 16 are located in spaces such as gaps in fittings of the hull 11, they are often manufactured at the same time as the construction of the hull 11, and there is almost no opportunity to perform the calibrations of the fuel senders 14*e*, 15*e*, and 16*e* before mounting the fuel tanks 14, 15, and 16 on the hull 11. On the other hand, since the management tank 17 is provided as a component of the fuel management system 18, it is manufactured before being mounted on the hull 11. Therefore, it is possible to perform a calibration of the fuel sender 17*e* of the management tank 17 before the management tank 17 is mounted on the hull 11, and at the time of completion of the marine vessel 10, sometimes an output value of the fuel sender 17*e* accurately indicates the remaining amount of the fuel.

In such a case, it is possible to perform the calibrations of the fuel sender 14*e* included in the fuel tank 14, the fuel sender 15*e* included in the fuel tank 15, and the fuel sender 16*e* included in the fuel tank 16 by using the output value of the fuel sender 17*e*. For example, in the case of transferring fuel from the management tank 17 to the fuel tank 15, the BCU 21 is able to determine (obtain) a decrease in the amount of fuel in the management tank 17 based on a change amount of the output value of the fuel sender 17*e*. The decrease in the amount of fuel in the management tank 17 is equal to the amount of the fuel transferred from the management tank 17 to the fuel tank 15, that is, is equal to the increase in the amount of the fuel in the fuel tank 15. Therefore, the BCU 21 is able to perform the calibration of the fuel sender 15*e* by comparing the decrease in the amount of the fuel in the management tank 17 with the change amount of the output value of the fuel sender 15*e* of the fuel tank 15.

In the case that the output value of the fuel sender 17*e* accurately indicates the remaining amount of the fuel, as described above, it is possible to perform the calibrations of the fuel sender 14*e* included in the fuel tank 14, the fuel sender 15*e* included in the fuel tank 15, and the fuel sender 16*e* included in the fuel tank 16 without using the flow meter 20. Further, regarding the transfer of fuel among the fuel tanks 14, 15, and 16, by always transferring fuel via the management tank 17, it is possible for the fuel sender 17*e* to determine (obtain) the fuel transfer amount (the transfer amount of the fuel). Therefore, in the case that the output value of the fuel sender 17*e* accurately indicates the remaining amount of the fuel, the flow meter 20 may be omitted from the fuel management system 18.

The fuel management system 18 is also able to adjust weights of the fuel tanks 14, 15, and 16, and the management tank 17 by controlling the transfer of fuel among the management tank 17 and the fuel tanks 14, 15, and 16. As shown in FIG. 1, since the fuel tanks 14, 15, and 16 and the management tank 17 are dispersed around the hull 11, it is conceivable to control an inclination of the hull 11 by adjusting the weights of the fuel tanks 14, 15, and 16 and the management tank 17. Therefore, in a preferred embodiment of the present invention, a roll angle and a pitch angle of the hull 11 are controlled by controlling the transfer of fuel among the management tank 17 and the fuel tanks 14, 15, and 16 by the fuel management system 18.

Figure 5A:
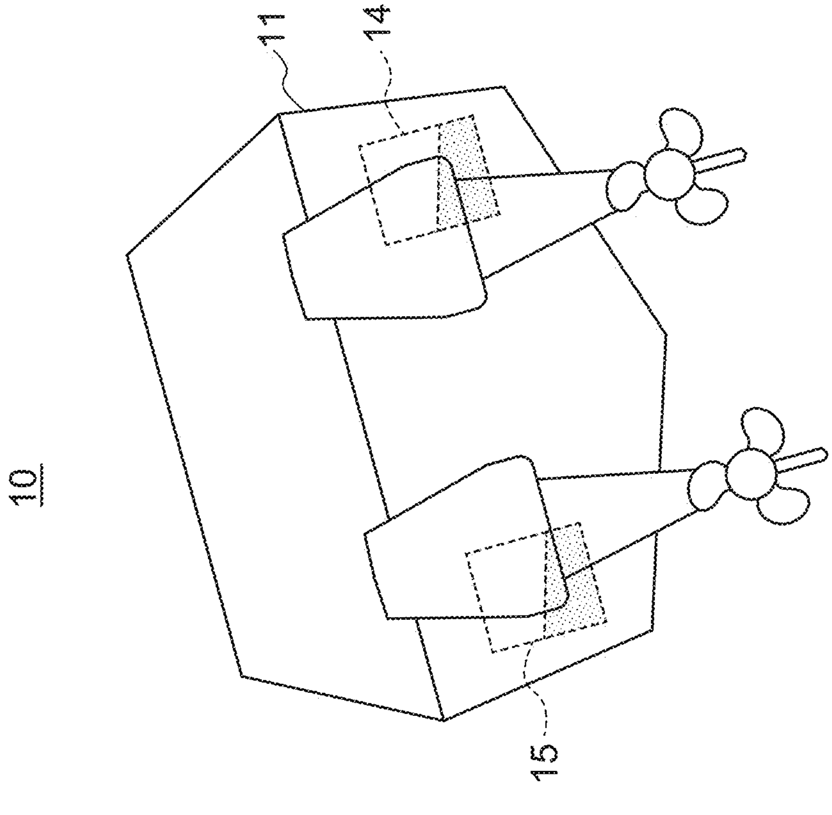
FIGS. 5A and 5B are diagrams for explaining control of a roll angle of a hull performed by the fuel management system according to a preferred embodiment of the present invention.
Figure 5B:
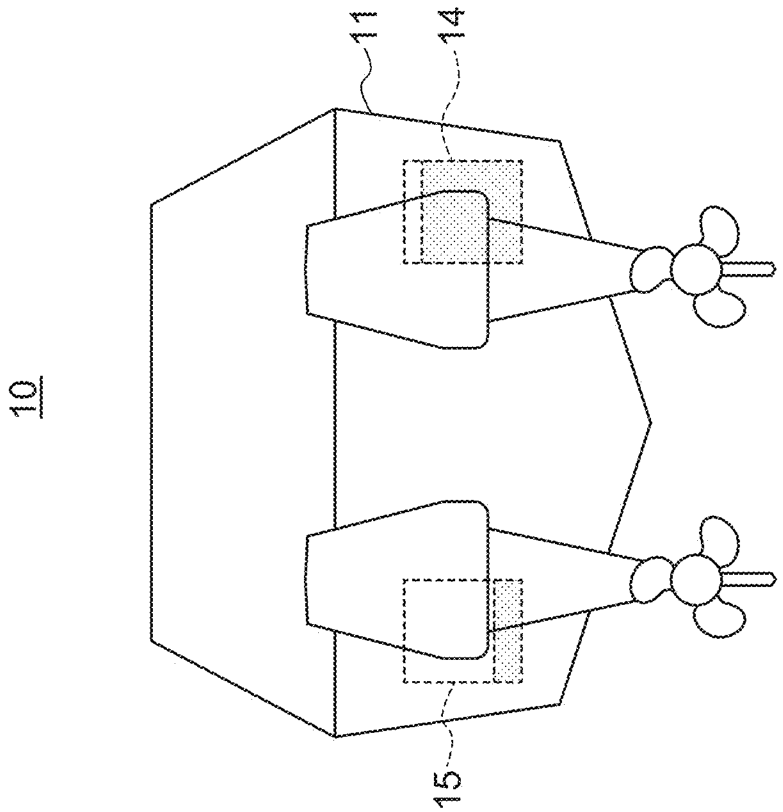

FIGS. 5A and 5B are diagrams for explaining control of the roll angle of the hull 11 performed by the fuel management system 18. It should be noted that FIGS. 5A and 5B show states in which the marine vessel 10 is viewed from the stern side.

As shown in FIG. 5A, in the case that the hull 11 rolls so that the port side is lowered, the fuel management system 18 transfers the fuel from the fuel tank 15 located on the port side to the fuel tank 14 located on the starboard side. As a result, the weight of the fuel tank 14 increases and a moment in the clockwise direction of FIG. 5A is generated, and as shown in FIG. 5B, the hull 11 rolls so that the starboard side is lowered and returns to a substantially horizontal state with respect to a roll direction. The control of the roll angle of the hull 11 by the transfer of fuel is used not only for returning to the horizontal state but also for intentionally adding a roll angle to the hull 11. For example, the control of the roll angle of the hull 11 by the transfer of fuel is also used in the case that the port side of the hull 11 is actively lowered to make it easier for passengers to board the marine vessel 10 from a pier, or in the case that the starboard side of the hull 11 is actively lowered to prevent the entry of droplets from the port side when receiving wind from the port side during navigation.

Figure 6A:
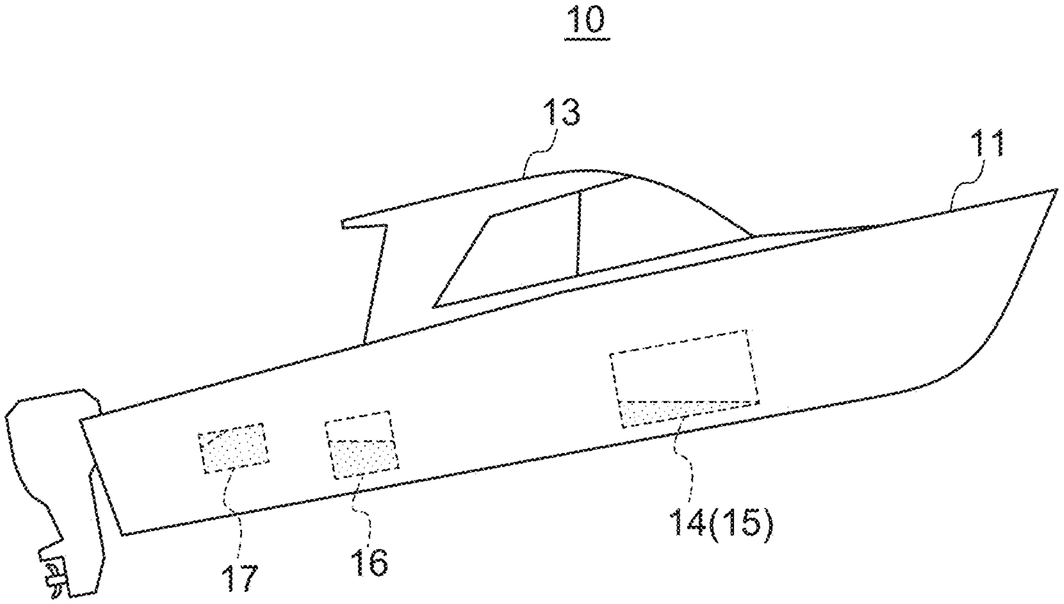
FIGS. 6A and 6B are diagrams for explaining control of a pitch angle of the hull performed by the fuel management system according to a preferred embodiment of the present invention.
Figure 6B:
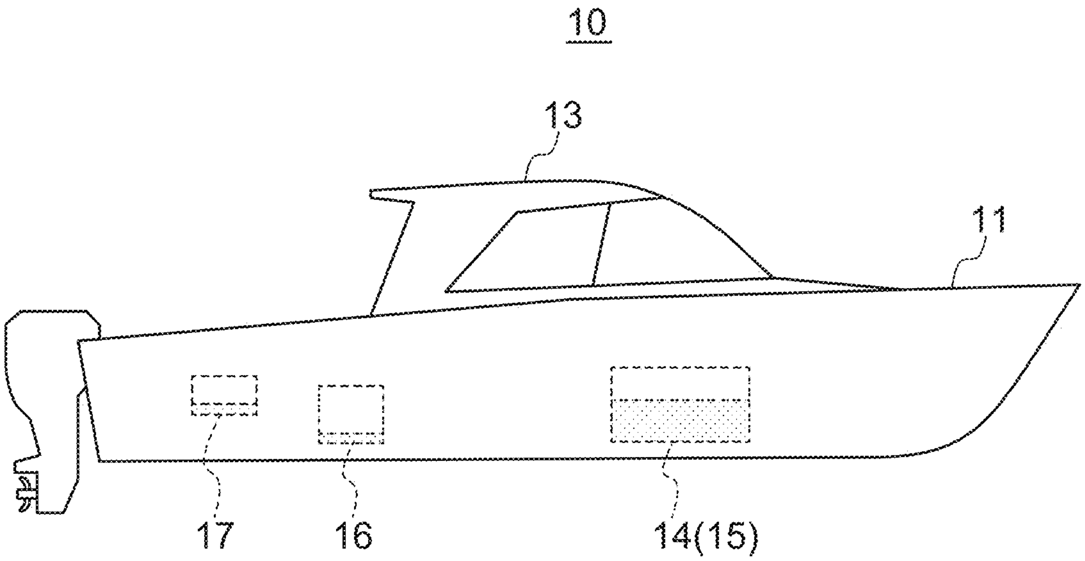

FIGS. 6A and 6B are diagrams for explaining control of the pitch angle of the hull performed by the fuel management system 18. It should be noted that FIGS. 6A and 6B show states in which the marine vessel 10 is viewed from the starboard side.

As shown in FIG. 6A, in the case that the bow of the hull 11 is raised more than necessary, the fuel management system 18 transfers fuel from the fuel tank 16 and the management tank 17, which are located on the stern side, to the fuel tanks 14 and 15, which are located on both sides of the cabin 13. As a result, the weights of the fuel tanks 14 and 15 increase and a moment in the clockwise direction of FIG. 6A is generated, and as shown in FIG. 6B, the bow of the hull 11 is lowered and returns to a substantially horizontal state with respect to a pitch direction. By returning to the substantially horizontal state with respect to the pitch direction during navigation, it is possible to reduce the resistance of water acting on the hull 11.

The marine vessel 10 may be provided with a user interface (UI) by which the passenger is able to instruct the transfer of fuel so that the roll angle and the pitch angle of the hull 11 is easily adjusted.

Figure 7:
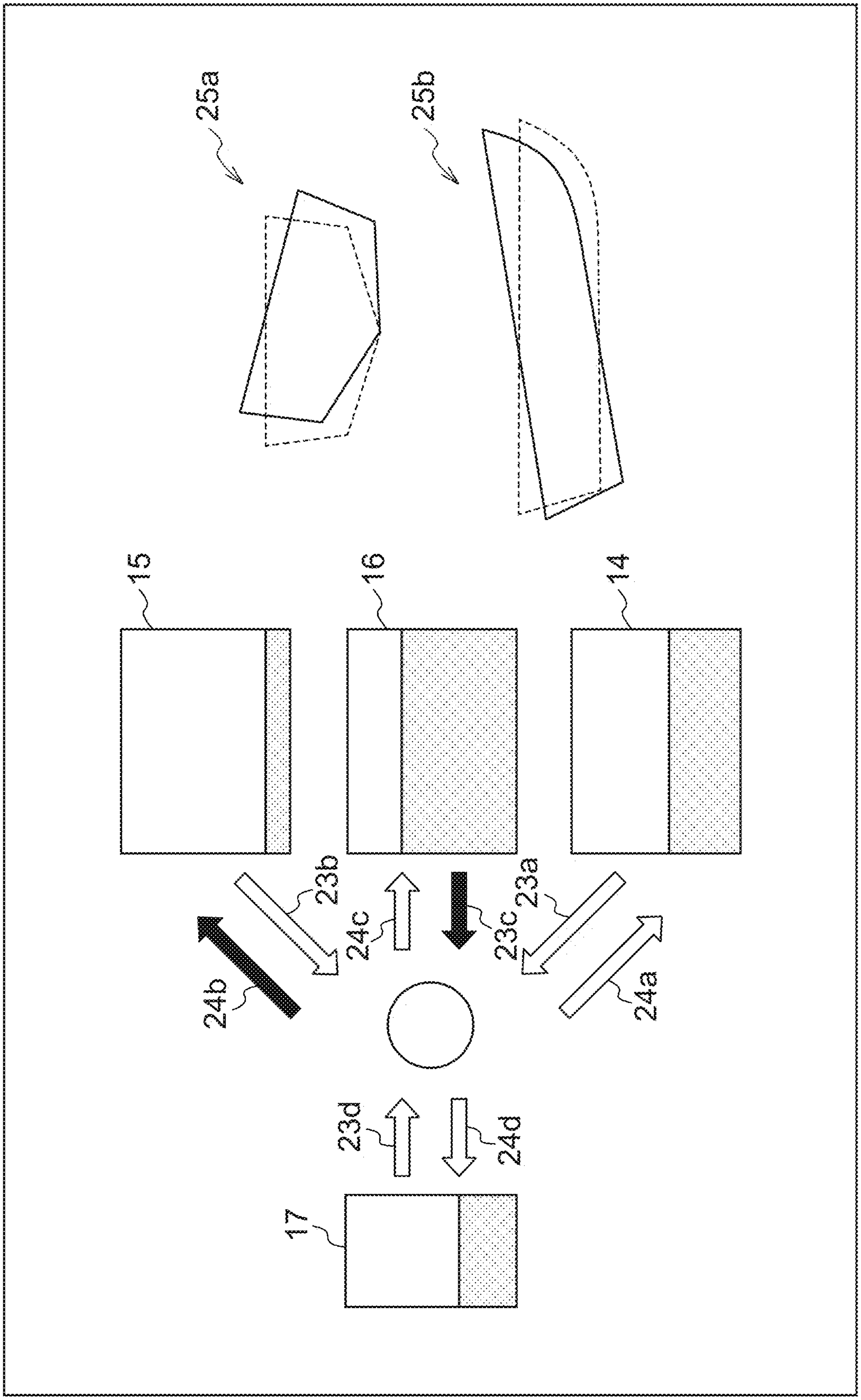
FIG. 7 is a diagram for explaining an example of a user interface to control the roll angle and the pitch angle of the hull by the transfer of fuel.

FIG. 7 is a diagram for explaining an example of the UI to control the roll angle and the pitch angle of the hull 11 by the transfer of fuel. A UI 22 shown in FIG. 7 is displayed, for example, on a touch panel of an MFD (Multi Function Display) located near a cockpit seat within the cabin 13.

The fuel tanks 14, 15, and 16, the management tank 17, and the fuel pump 19 are schematically displayed on the UI 22, and in each of the fuel tanks 14, 15, and 16 and the management tank 17, the remaining amount of the fuel is shown schematically (is shown in gray in FIG. 7). Further, in the UI 22, as shown in FIG. 7, an arrow 23*a* indicating the transfer of fuel from the fuel tank 14 to the fuel pump 19 and an arrow 24*a* indicating the transfer of fuel from the fuel pump 19 to the fuel tank 14 are shown between the fuel tank 14 and the fuel pump 19; an arrow 23*b* indicating the transfer of fuel from the fuel tank 15 to the fuel pump 19 and an arrow 24*b* indicating the transfer of fuel from the fuel pump 19 to the fuel tank 15 are shown between the fuel tank 15 and the fuel pump 19; an arrow 23*c* indicating the transfer of fuel from the fuel tank 16 to the fuel pump 19 and an arrow 24*c* indicating the transfer of fuel from the fuel pump 19 to the fuel tank 16 are shown between the fuel tanks 16 and the fuel pump 19; an arrow 23*d* indicating the transfer of fuel from the management tank 17 to the fuel pump 19 and an arrow 24*d* indicating the transfer of fuel from the fuel pump 19 to the management tank 17 are shown between the management tank 17 and the fuel pump 19. Further, the UI 22 shows an icon 25*a* schematically showing the current roll angle of the marine vessel 10 and an icon 25*b* schematically showing the current pitch angle of the marine vessel 10. For example, the icon 25*a* corresponding to the current roll angle of the marine vessel 10 is a sketch of the hull 11 viewed from the stern side, the current state is indicated by a solid line, and the horizontal state is indicated by a broken line. For example, the icon 25*b* corresponding to the current pitch angle of the marine vessel 10 is a sketch of the hull 11 viewed from the starboard side, the current state is indicated by a solid line, and the horizontal state is indicated by a broken line. It should be noted that the current states of the icons 25*a* and 25*b* are displayed in real time.

In the UI 22, the passenger is able to specify the fuel transfer source and the fuel transfer destination by touching and selecting desired arrows from the arrows 23*a* to 23*d* and the arrows 24*a* to 24*d*. For example, in FIG. 7, the arrow 23*c* indicating the transfer of fuel from the fuel tank 16 to the fuel pump 19 and the arrow 24*b* indicating the transfer of fuel from the fuel pump 19 to the fuel tank 15 are selected by a touch operation of the passenger (in FIG. 7, the selected arrow is shown as a black arrow). In this state, when the passenger touches an execute button (not shown), the fuel management system 18 executes the transfer of fuel from the fuel tank 16 to the fuel tank 15. The transfer of fuel may be continued while the passenger is touching the execute button. Alternatively, the UI 22 may be provided with an input field in which the transfer amount is able to be set, and the transfer of fuel may be continued until the transfer amount inputted into the input field is reached.

In the UI 22, the passenger is able to control the transfer of fuel among the management tank 17 and the fuel tanks 14, 15, and 16 only by the touch operation while watching the icons 25*a* and 25*b* which are changing in real time. As a result, it is possible to easily perform attitude control of the marine vessel 10, and it is possible to reduce a burden on the passenger.

Although preferred embodiments of the present invention have been described above, the present invention is not limited to the above-described preferred embodiments, and various modifications and changes can be made within the scope of the gist thereof.

For example, the fuel management system 18 does not necessarily have to include the management tank 17, and the fuel management system 18 may control the transfer of fuel only among the three fuel tanks (i.e., the fuel tanks 14, 15, and 16). Further, the number of fuel pumps 19 included in the fuel management system 18 is not limited to one, and for example, a fuel pump may be provided corresponding to each of the fuel tanks 14, 15, and 16.

Furthermore, the number of the outboard motors 12 included in the marine vessel 10 is not limited to two, and the marine vessel 10 may include a single outboard motor 12 or three or more outboard motors 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel management system to control remaining amounts of fuel in a plurality of fuel tanks mounted on a hull of a marine vessel, the fuel management system comprising:
- a fuel pump;
- a fuel meter;
- a plurality of first fuel flow channels corresponding to the plurality of fuel tanks to connect the plurality of fuel tanks to an upstream side of the fuel pump and the flow meter;
- a plurality of second fuel flow channels corresponding to the plurality of fuel tanks to connect the plurality of fuel tanks to a downstream side of the fuel pump and the flow meter; and
- a controller configured or programmed to transfer fuel from one fuel tank of the plurality of fuel tanks to another fuel tank of the plurality of fuel tanks by the fuel pump; wherein
- each of the plurality of fuel tanks includes a fuel sender; and
- when transferring fuel from the one fuel tank to the another fuel tank by the fuel pump, the controller is configured or programmed to perform a calibration of the fuel sender of the another fuel tank by using a change in an output value of the fuel sender of the another fuel tank and a transfer amount of the fuel from the one fuel tank to the another fuel tank that is measured by the flow meter.

2. The fuel management system according to claim 1, wherein the controller is configured or programmed to control an inclination of the hull by transferring fuel from the one fuel tank to the another fuel tank by the fuel pump.

3. The fuel management system according to claim 1, further comprising:
- a plurality of first valves located in the plurality of first fuel flow channels, respectively, to open and close the plurality of first fuel flow channels; and
- a plurality of second valves located in the plurality of second fuel flow channels, respectively, to open and close the plurality of second fuel flow channels.

4. The fuel management system according to claim 1, further comprising:

a management tank connected to an engine;

a third fuel flow channel to connect the management tank to the upstream side of the fuel pump and the flow meter; and a fourth fuel flow channel to connect the management tank to the downstream side of the fuel pump and the flow meter.

5. The fuel management system according to claim 4, wherein the controller is configured or programmed to transfer fuel from the management tank to the one fuel tank of the plurality of fuel tanks by the fuel pump.

6. The fuel management system according to claim 5, wherein the controller is configured or programmed to control an inclination of the hull by transferring fuel from the management tank to the one fuel tank by the fuel pump.

7. The fuel management system according to claim 4, wherein the controller is configured or programmed to transfer fuel from the one fuel tank of the plurality of fuel tanks to the management tank by the fuel pump.

8. The fuel management system according to claim 7, wherein the controller is configured or programmed to control an inclination of the hull by transferring fuel from the one fuel tank to the management tank by the fuel pump.

9. The fuel management system according to claim 4, wherein a third valve to open and close the third fuel flow channel is located in the third fuel flow channel; and a fourth valve to open and close the fourth fuel flow channel is located in the fourth fuel flow channel.

10. A fuel management system to control remaining amounts of fuel in a plurality of fuel tanks mounted on a hull of a marine vessel, the fuel management system comprising:

a fuel pump;

a fuel meter;

a plurality of first fuel flow channels corresponding to the plurality of fuel tanks to connect the plurality of fuel tanks to an upstream side of the fuel pump and the flow meter;

a plurality of second fuel flow channels corresponding to the plurality of fuel tanks to connect the plurality of fuel tanks to a downstream side of the fuel pump and the flow meter;

a management tank connected to an engine;

a third fuel flow channel to connect the management tank to the upstream side of the fuel pump and the flow meter;

a fourth fuel flow channel to connect the management tank to the downstream side of the fuel pump and the flow meter; and a controller configured or programmed to transfer fuel from the management tank to one fuel tank of the plurality of fuel tanks by the fuel pump; wherein when transferring fuel from the management tank to the one fuel tank by the fuel pump, the controller is configured or programmed to perform a calibration of a fuel sender of the one fuel tank by using a change in an output value of the fuel sender of the one fuel tank and a transfer amount of the fuel from the management tank to the one fuel tank that is measured by the flow meter.

11. A fuel management system to control remaining amounts of fuel in a plurality of fuel tanks mounted on a hull of a marine vessel, the fuel management system comprising:

a fuel pump;

a fuel meter;

a plurality of first fuel flow channels corresponding to the plurality of fuel tanks to connect the plurality of fuel tanks to an upstream side of the fuel pump and the flow meter;

a plurality of second fuel flow channels corresponding to the plurality of fuel tanks to connect the plurality of fuel tanks to a downstream side of the fuel pump and the flow meter;

a management tank connected to an engine;

a third fuel flow channel to connect the management tank to the upstream side of the fuel pump and the flow meter;

a fourth fuel flow channel to connect the management tank to the downstream side of the fuel pump and the flow meter; and a controller configured or programmed to transfer fuel from the management tank to one fuel tank of the plurality of fuel tanks by the fuel pump; wherein the management tank includes a calibrated fuel sender; and when transferring fuel from the management tank to the one fuel tank by the fuel pump, the controller is configured or programmed to perform a calibration of a fuel sender of the one fuel tank by using a change in an output value of the fuel sender of the one fuel tank and a change in an output value of the calibrated fuel sender.

12. A fuel management system including a fuel pump to control remaining amounts of fuel in a plurality of fuel tanks mounted on a hull of a marine vessel, the fuel management system comprising:

a management tank connected to an engine;

a plurality of first fuel flow channels corresponding to the plurality of fuel tanks to connect the plurality of fuel tanks to an upstream side of the fuel pump;

a plurality of second fuel flow channels corresponding to the plurality of fuel tanks to connect the plurality of fuel tanks to a downstream side of the fuel pump;

a third fuel flow channel to connect the management tank to the upstream side of the fuel pump;

a fourth fuel flow channel to connect the management tank to the downstream side of the fuel pump; and a controller configured or programmed to transfer fuel from the management tank to one fuel tank of the plurality of fuel tanks by the fuel pump; wherein each of the plurality of fuel tanks includes a fuel sender;

the management tank includes a calibrated fuel sender; and when transferring fuel from the management tank to the one fuel tank by the fuel pump, the controller is configured or programmed to perform a calibration of the fuel sender of the one fuel tank by using a change in an output value of the fuel sender of the one fuel tank and a change in an output value of the calibrated fuel sender.

* * * * *